US009706749B2

(12) United States Patent
Link

(10) Patent No.: US 9,706,749 B2
(45) Date of Patent: Jul. 18, 2017

(54) COLLAPSIBLE ANIMAL ENCLOSURE

(71) Applicant: Precision Pet Products, Inc., Costa Mesa, CA (US)

(72) Inventor: David Link, Costa Mesa, CA (US)

(73) Assignee: DOSKOCIL MANUFACTURING COMPANY, INC., Arlington, TX (US)

( * ) Notice: Subject to any disclaimer, the term of this patent is extended or adjusted under 35 U.S.C. 154(b) by 112 days.

(21) Appl. No.: 14/691,836

(22) Filed: Apr. 21, 2015

(65) Prior Publication Data

US 2015/0305297 A1  Oct. 29, 2015

Related U.S. Application Data

(60) Provisional application No. 61/983,909, filed on Apr. 24, 2014.

(51) Int. Cl.
*A01K 1/02* (2006.01)
*A01K 1/03* (2006.01)

(52) U.S. Cl.
CPC ............ *A01K 1/0245* (2013.01); *A01K 1/034* (2013.01)

(58) Field of Classification Search
CPC .......... A01K 1/03; A01K 31/06; A01K 31/08; A01K 1/032; A01K 1/033; A01K 1/0245; A01K 1/034; A01K 1/031; A01K 31/07
USPC ....... 119/452, 453, 459, 461, 462, 463, 464, 119/472, 473, 474, 475, 479, 482, 489, 119/490, 491, 492, 496, 498, 499
See application file for complete search history.

(56) References Cited

U.S. PATENT DOCUMENTS

| | | | |
|---|---|---|---|
| 2,892,562 A * | 6/1959 | Smithson | A01K 1/03 119/169 |
| 3,556,058 A * | 1/1971 | Smiler | A01K 31/08 119/474 |
| 3,896,766 A | 7/1975 | Martin | |
| 4,016,833 A | 4/1977 | Ray | |
| 4,140,080 A | 2/1979 | Snader | |
| 4,527,512 A | 7/1985 | Sugiura | |
| 4,590,885 A | 5/1986 | Sugiura | |
| 4,762,085 A | 8/1988 | Ondrasik | |
| 4,763,606 A | 8/1988 | Ondrasik | |
| 4,917,047 A | 4/1990 | Wazeter, III | |
| 5,097,796 A | 3/1992 | Reimers | |
| 5,233,939 A | 8/1993 | Randolph | |
| 5,335,618 A | 8/1994 | Zarola | |
| 5,482,005 A | 1/1996 | Thom | |
| 5,544,619 A | 8/1996 | Braun | |
| 5,549,073 A | 8/1996 | Askins et al. | |
| 5,626,098 A | 5/1997 | Askins et al. | |
| 5,653,194 A | 8/1997 | Guy | |
| 5,752,470 A | 5/1998 | Koneke | |
| 5,950,568 A | 9/1999 | Axelrod et al. | |

(Continued)

*Primary Examiner* — Trinh Nguyen
(74) *Attorney, Agent, or Firm* — Global IP Counselors, LLP

(57) ABSTRACT

An animal enclosure and method of collapsing the enclosure is disclosed. The enclosure is fabricated from a plurality of panels. One or more first panels have elongate rods whose end portions are formed into a hook. An edge rod of an adjacent second panel is disposed within the hooked end portion of the first panel. By offsetting the hooked end portion of the first panel from the plane within which the first panel resides, the first and second panels to be stacked upon each other by pivoting the second panel onto the first panel.

7 Claims, 10 Drawing Sheets

(56) References Cited

U.S. PATENT DOCUMENTS

| | | | |
|---|---|---|---|
| 5,967,089 A | 10/1999 | Allen | |
| 6,092,488 A | 7/2000 | Allawas | |
| 6,152,081 A | 11/2000 | Baker | |
| 6,155,206 A | 12/2000 | Godshaw | |
| 6,192,834 B1 | 2/2001 | Kolozsvari | |
| 6,631,590 B1 | 10/2003 | Glowaski | |
| 6,681,720 B1 | 1/2004 | Skurdalsvold et al. | |
| 8,985,058 B2 * | 3/2015 | Cantwell | A01K 1/0245 119/474 |
| 9,420,757 B2 * | 8/2016 | Cantwell | A01K 1/0017 |
| 2005/0034679 A1 * | 2/2005 | Link | A01K 1/0245 119/474 |
| 2015/0305297 A1 * | 10/2015 | Link | A01K 1/0245 119/474 |

\* cited by examiner

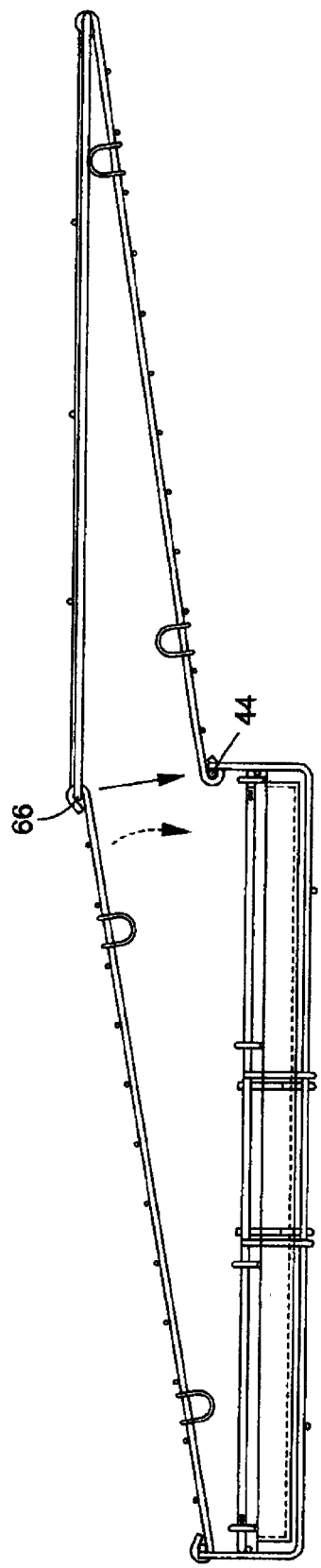

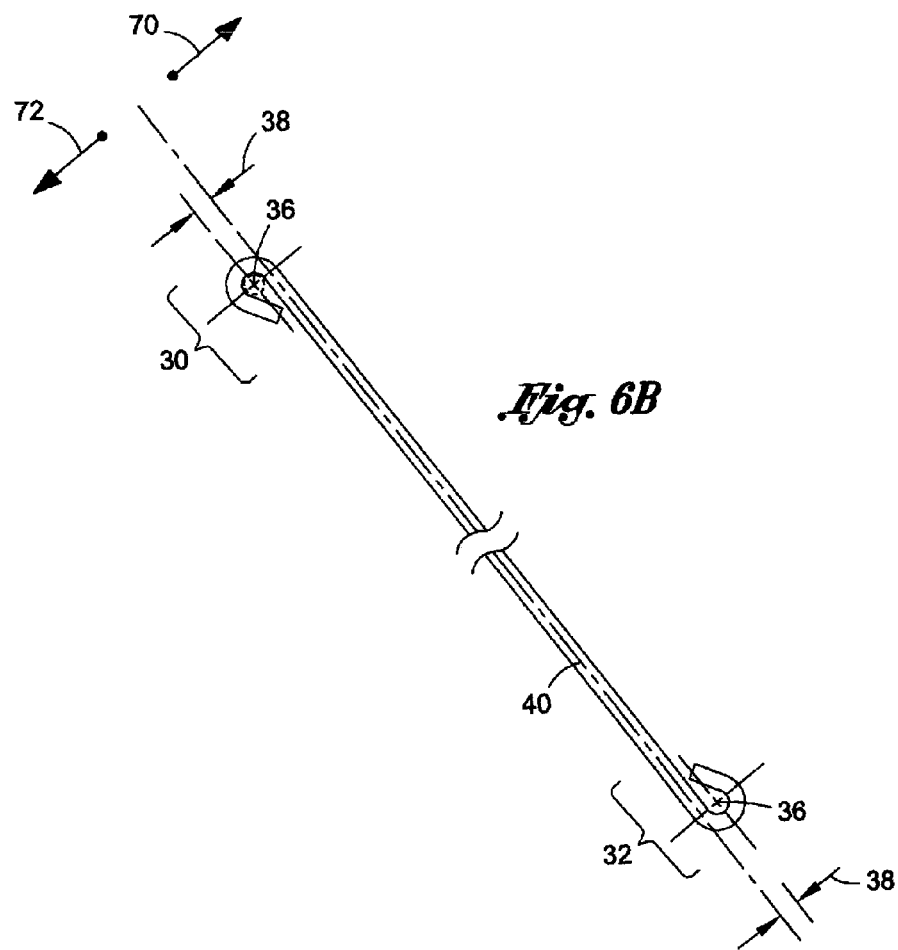
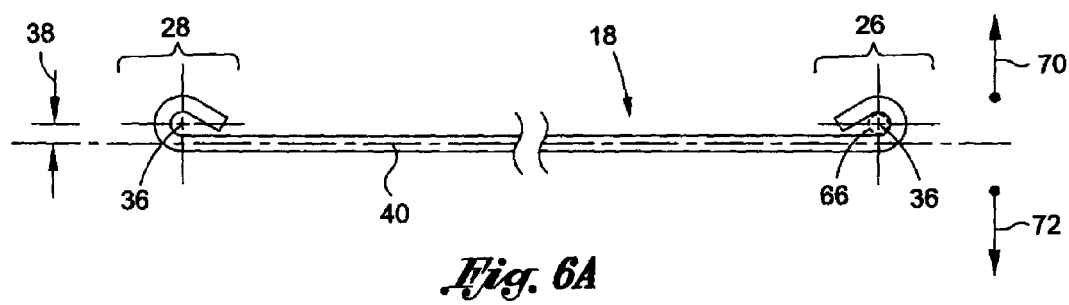

COLLAPSIBLE ANIMAL ENCLOSURE

CROSS-REFERENCE TO RELATED APPLICATIONS

The present application claims priority to, and the benefit of, U.S. Provisional Application Ser. No. 61/983,909 entitled "Collapsible Animal Enclosure" filed on Apr. 24, 2014, the disclosure of which is herein incorporated by reference in its entirety.

STATEMENT RE: FEDERALLY SPONSORED RESEARCH/DEVELOPMENT

Not Applicable

BACKGROUND

The embodiments and aspects disclosed herein relate to collapsible animal enclosures.

Collapsible animal enclosures exist in the market place. Unfortunately, these enclosures are expensive to manufacture due to the number of components involved in providing for the collapsibility of the animal enclosure. Additionally, these collapsible animal enclosures may be difficult to collapse or erect due to binding of the joints that attach the panels to each other.

Accordingly, there is a need in the art for an improved animal enclosure.

BRIEF SUMMARY

The various aspects and embodiments of an animal enclosure described herein address the needs discussed above, discussed below and those that are known in the art.

The animal enclosure has a plurality of panels that form the enclosure to retain an animal within the enclosure. The panels may be fabricated from a plurality of transverse rods. The opposed distal end portions of the rods may have a hook configuration. The hook configured distal end portions may be hooked onto edge rods of an adjacent panel. By offsetting the hook configured distal end portion, the two panels that are pivotally joined to each other may be pivoted and stacked upon each other. By orienting the hook configured distal end portions of the rods that make up the various panels, the enclosure is capable of being traversed flat by stacking the panels upon each other. By way of example and not limitation, the hooked configured opposed distal end portions of the rods of a panel may be oriented in opposite directions so that the adjacent panels pivotally attached thereto may be stacked upon each other in a zig-zag configuration.

More particularly, a collapsible enclosure for containing an animal is disclosed. The enclosure may comprise a top panel, a bottom panel, a front panel, a rear panel, a left panel and a right panel.

The top panel has front, rear, left and right rods. The bottom panel is disposed below the top panel when the collapsible enclosure is in an erected position. The bottom panel has front, rear, left and right rods. The front panel is pivotally attached to the front rod of the bottom panel and removably attachable to the front rod of the top panel. The rear panel is pivotally attached to the rear rod of the bottom panel and removably attachable to the rear rod of the top panel. The left panel is pivotally attached to the left rods of the top and bottom panels. The left panel has a plurality of vertical rods. Each of the vertical rods of the left panel define opposed end portions that are wrapped around the left rods of the top and bottom panels in a hook configuration for pivotally attaching the left panel to the left rods of the top and bottom panels. The opposed end portions of the vertical rods of the left panel are wrapped in a common direction to the left rods of the top and bottom panels. The right panel is pivotally attached to the right rods of the top and bottom panels. The right panel has a plurality of vertical rods. Each of the vertical rods of the right panel define opposed end portions that are wrapped around the right rods of the top and bottom panels in the hook configuration for pivotally attaching the right panel to the right rods of the top and bottom panel. The upper end portions of the vertical rods of the right panel are wrapped in different directions to the left rods of the top and bottom panels.

The hook configuration of the opposed end portions of the vertical rods of the left and right panels place or position the left and right panels in a plane offset from pivot axes defined by the hook configured opposed end portions of the vertical rods of the left and right panels. The left and right panels and the top panel are pivotably stacked and placed in a parallel configuration on top of the bottom panel when the enclosure is collapsed.

The common direction is outward so that the hook configured opposed end portions of the vertical rods of the left panel are directed outward. The left panel is also in a plane offset inward from the pivot axes of the hook configured opposed end portions of the vertical rods of the left panel.

The different directions may be outward and inward. The hook configured upper end portions of the vertical rods of the right panel are directed inward, whereas, the hook configured lower end portions of the vertical rods of the right panel are directed outward.

The right rod of the bottom panel may be vertically offset from a plane of the bottom panel an equal distance compared to the left rod of the bottom panel.

The hook configured lower end portions of the vertical rods of the right panel may be directed outward.

Each of the panels may be fabricated from a plurality of rods perpendicular to each other.

A single left rod of the top panel may be enclosed within the hook configured upper end portions of the left panel. Likewise, a single right rod of the top panel may be enclosed within the hook configured upper end portions of the right panel.

In another aspect, an enclosure traversable between an erected position and a collapsed position is disclosed. The enclosure may comprise a first panel, a second panel and a third panel. The first panel may have a plurality of elongate rods defining first and second opposed end portions having a hook configuration. The second panel may have an edge rod which is disposed within the first hook configured opposed end portion. The third panel may have an edge rod which is disposed within the second hook configured opposed end portion.

The hook configured first and second opposed end portions may be directed in opposite directions. Alternatively, the hook configured first and second opposed end portions may be directed in a common direction.

The pivot axes defined by the hook configured first and second opposed end portions may be offset from a plane within which the first panel resides for allowing the first, second and third panels to be collapsed into a zig zag configuration.

The second and third panels may be attached to each other to form an enclosure.

The enclosure may have one or more additional panels wherein end panels are attachable to each other to form an enclosure.

In another aspect, a method for collapsing an enclosure used to contain an animal is disclosed. The method may comprise the steps of pivoting front and rear panels inward to stack the front and rear panels on top of a bottom panel; pivoting the left and right panels to the right to traverse a left rod of the top panel toward a right rod of the bottom panel; disposing the left panel below the left rod of the bottom panel by providing lower end portions of the vertical rods of the left panel that are wrapped around the left rod of the bottom panel in an outward direction, the lower end portions of the vertical rods of the left panel having a hook configuration; disposing the top panel offset from the right panel by providing upper end portions of the vertical rods of the right panel that are wrapped around the right rod of the top panel in an inward direction, the upper end portions of the vertical rods of the right panel having a hook configuration; pivoting the top and right panels to the left until the top and right panels are disposed above the left and bottom panels; and disposing the top panel offset from the left panel by providing upper end portions of the vertical rods of the left panel that are wrapped around the left rod of the top panel in an outward direction, the upper end portions of the vertical rods of the left panel having a hook configuration.

BRIEF DESCRIPTION OF THE DRAWINGS

These and other features and advantages of the various embodiments disclosed herein will be better understood with respect to the following description and drawings, in which like numbers refer to like parts throughout, and in which:

FIG. 5B is a front view of the enclosure shown in FIG. 5A wherein a left panel is being stacked onto the bottom panel;

FIG. 6A is an enlarged view of the left panel shown in FIG. 5C;

FIG. 6B is an enlarged view of the right panel shown in FIG. 5D;

DETAILED DESCRIPTION

Figure 1:
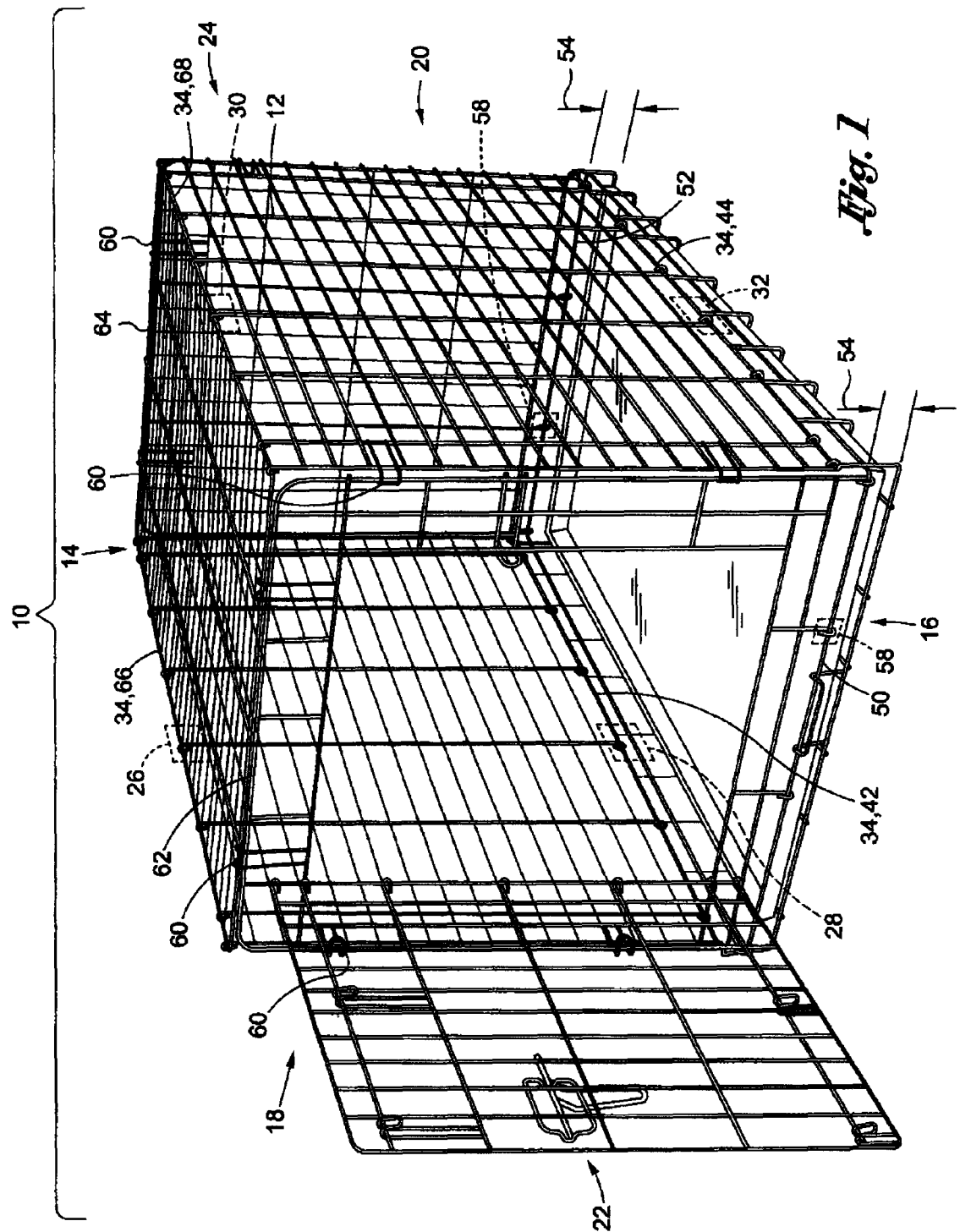
FIG. 1 is a perspective view of a collapsible enclosure.

Referring now to the drawings, an animal enclosure 10 is shown. The animal enclosure 10 is traversable between an erected position (See FIG. 1) and a collapsed position (see FIG. 5D). The collapsible animal enclosure 10 is formed with a plurality of rods 12 that form wall panels 14-24 of the enclosure 10. The vertical rods 12 of the left and right side wall panels 18, 20 have vertical end portions 26, 28, 30, 32 that are wrapped around horizontal rods 34 of adjacent top and bottom panels 14, 16 that allow for snag free rotational movement and low cost. In particular, the vertical end portions 26-32 have a hook configuration, as shown in FIGS. 6A-6B. The hook configuration of the vertical end portions 26-32 define a pivot axis 36 which is offset by a distance 38 to a plane 40 within which the left and right side wall panels 18, 20 reside to allow for the stacking of the panels upon each other. The offset distance 38 between the pivot axis 36 and the plane 40 and the orientations of the hook configuration of the vertical end portions 26-32 allow the left, top, right wall panels 18, 14, 20 to be collapsed in a zigzag manner on top of the bottom panel 16 for the purposes of transportation and/or storage, as shown in FIG. 5D.

Referring now to FIG. 1, a perspective view of the animal enclosure 10 is shown. The bottom panel 16 has left and right edge rods 42, 44. The left edge rod 42 is vertically offset from a plane 40 within which the bottom panel 16 resides by a distance 46 (see FIG. 2). The right edge rod 44 is also vertically offset from the plane 40 within which the bottom panel 16 resides by distance 48 (see FIG. 2). The distance 46 may be equal to the distance 48 but it is also contemplated that the distance 46 may be smaller than the distance 48 to provide space for the stacking of panels 18, 14, 20. The front edge rod 50 is also vertically offset from the plane 40 within which the bottom panel 16 resides by distance 54. Additionally, the back edge rod 52 is also vertically offset from the plane 40 within which the bottom panel 16 resides by the same distance 54. However, it is also contemplated that the front and rear edge rods 50, 52 of the bottom panel 16 may be vertically offset from the plane 40 within which the bottom panel 16 resides by different distances. The front and back panels 22, 24 may be folded inward and stacked on top of the bottom panel 16 within the space between the plane 40 within which the bottom panel 16 resides and the front and back edge rods 50, 52 of the bottom panel 16.

Figure 2:
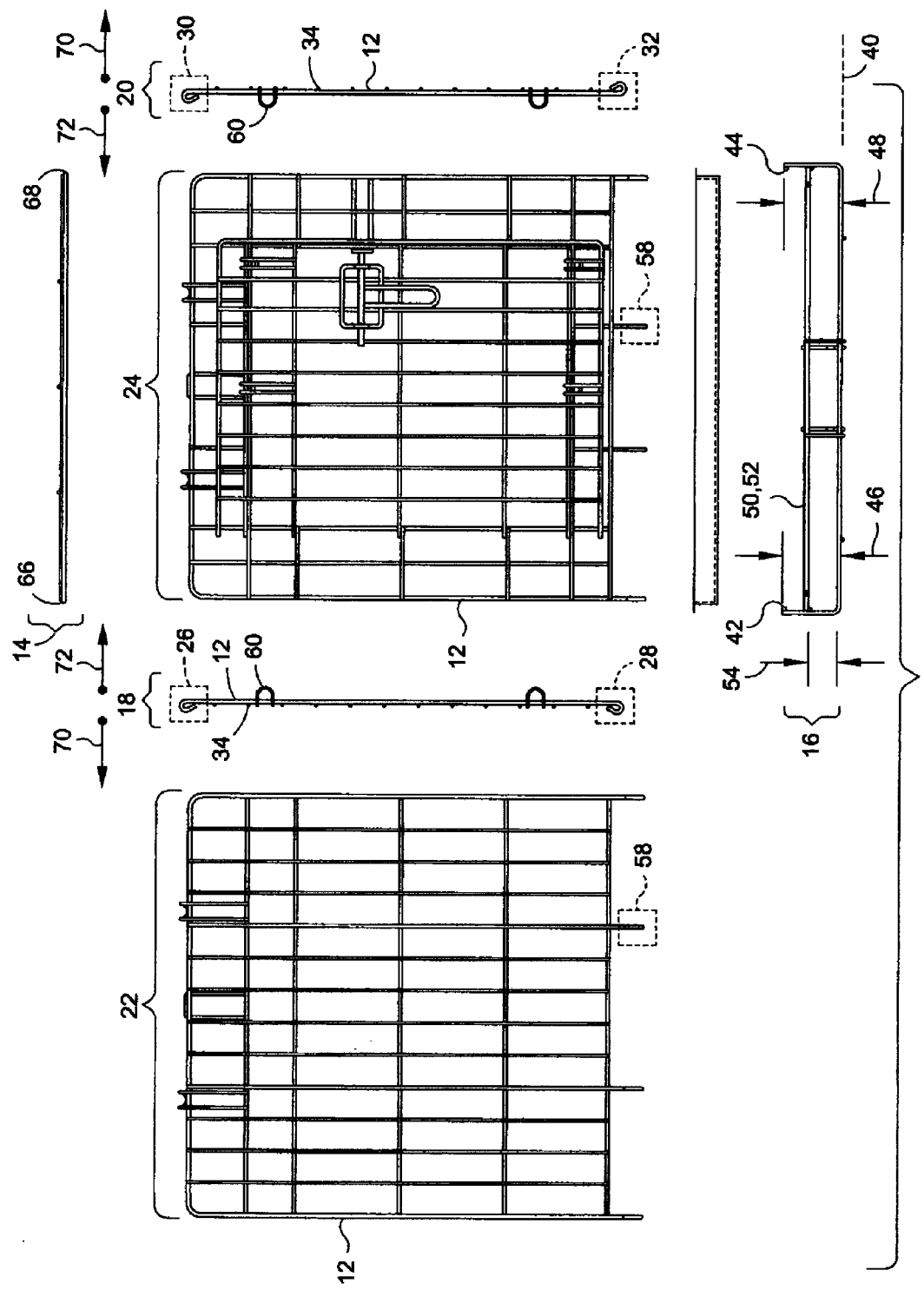
FIG. 2 is an exploded plan front view of the collapsible enclosure shown in FIG. 1.
Figure 4B:
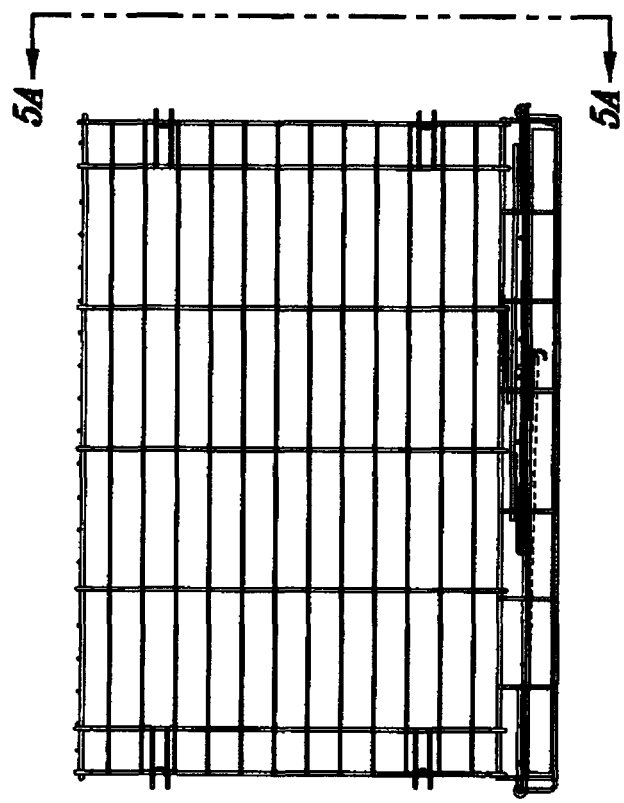
FIG. 4B is a side view of the enclosure shown in FIG. 4A wherein the front and back panels are stacked upon the bottom panel.
Figure 4A:
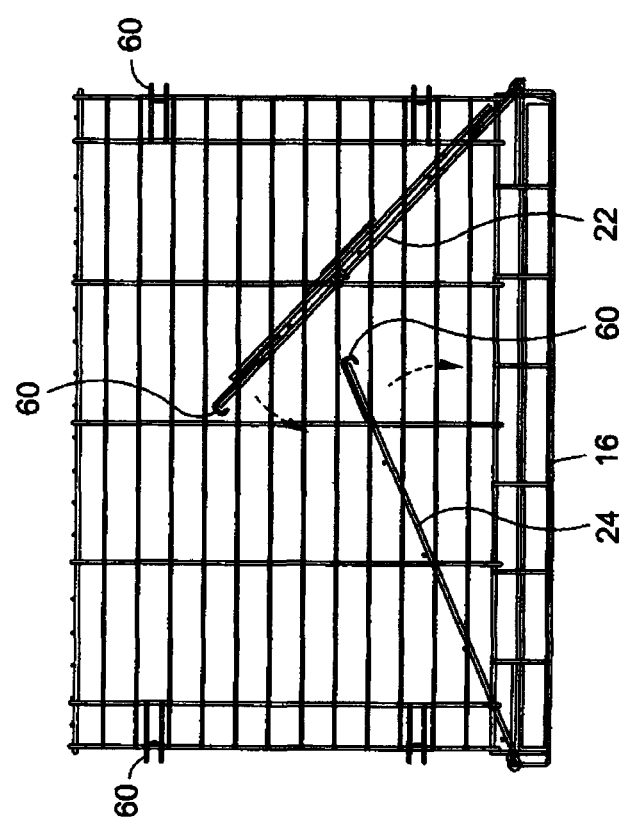
FIG. 4A is a side view of the enclosure shown in FIG. 1 wherein front and back panels traversed toward a bottom panel.

Referring now to FIG. 2, an exploded plan view of the animal enclosure 10 is shown. The bottom panel 16 has the left and right edge rods 42, 44. The edge rods 42, 44 may be at the same height or vertically offset at different distances 46, 48. If the distances 46, 48 are different, then the difference between the distances 46, 48 provides for the space within which the left, top, right wall panels 18, 14, 20 fit into when the enclosure 10 is traversed to the collapsed position. The bottom panel 16 also has front and rear edge rods 50, 52 which may be vertically offset by the same distance from the plane 40 within which the bottom panel 16 resides. Prior to collapsing the left, top and right panels 18, 14, 20, the front and back panels 22, 24 may be folded inward and stacked on top of the bottom panel 16 to fit within the space defined by the vertical offset or distance 54 as shown in FIG. 4A.

Each of the panels 14-24 may be fabricated from a plurality of perpendicularly oriented elongate rods 12, 34 that form a grid so that the animal contained within the enclosure 10 cannot escape. The front and back panels 22, 24 have vertical rods 12. One or more of the vertical rods 12 may have a lower end portion 58 that have a hook configuration. The lower end portions 58 of the vertical rods 12 of the front and back panels 22, 24 are wrapped around the front and rear edge rods 50, 52 of the bottom panel 16. In traversing the enclosure 10 from the erected position (see FIG. 1) to the collapsed position (see FIG. 5D), panel hooks 60 of the front and rear panels 22, 24 are unlatched from front and rear edge rods 62, 64 of the top panel 14. Also, panel hooks 60 of the left and right wall panels 18, 20 are also unlatched from the front and rear wall panels 22, 24. With the panel hooks 60 of the front and rear panels 22, 24 unlatched from the front and rear edge rods 62, 64 of the top panel 14 and the panel hooks 60 of the left and right wall panels 18, 20 unlatched from the front and rear wall panels 22, 24, the user collapses the front and rear panels 22, 24 on top of the bottom panel 16, as shown in FIGS. 4A and 4B. At this point, only the left and right side wall panels 18, 20 and the top panel 14 are standing as shown in FIG. 4B. Moreover, these panels 18, 20, 24 would fall down if not held by the user in the position shown in FIG. 4B.

Figure 3:
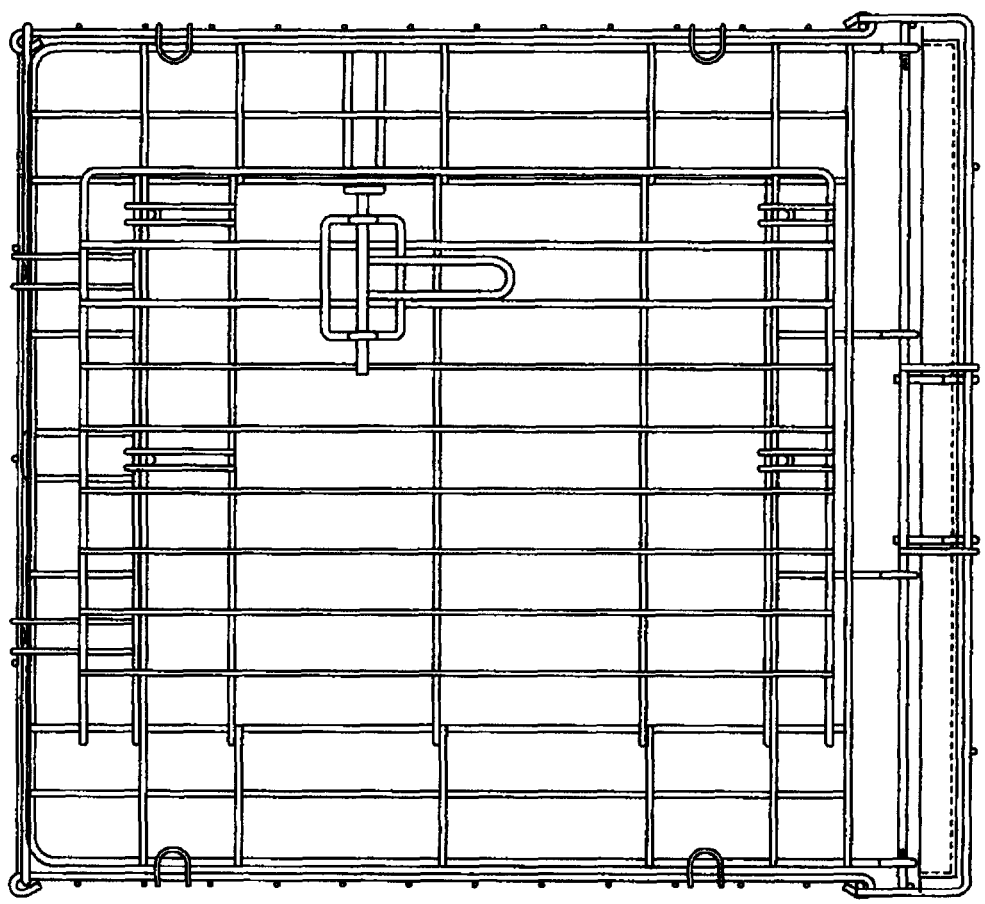
FIG. 3 is an assembled plan front view of the collapsible enclosure shown in FIG. 1.

The left and right wall panels 18, 20 also have vertical and horizontal rods 12, 34. The vertical rods 12 of the left and right wall panels 18, 20 define opposed upper and lower end portions 26-32 (see FIG. 2). The upper and lower end portions 26-32 are wrapped around the left and right edge rods 42, 44 of the bottom panel 16 and the left and right edge rods 66, 68 of the top panel 14. The upper and lower end portions 26-32 are wrapped around the edge rods 42, 44, 66, 68 in either a first direction or a second direction 70, 72. The first direction 70 is outward, whereas, the second direction 72 is inward. In the embodiment shown in FIGS. 1-5D, the upper end portions 26 of the vertical rods 12 of the left panel 18 are wrapped around the left edge rod 66 of the top panel 14 in the first direction 70 (i.e., outward). The lower end portions 28 of the vertical rods 12 of the left panel 18 are also wrapped around the left edge rod 42 of the bottom panel 14 in the first direction 70 (i.e., outward). The upper end portions 30 of the vertical rods 12 of the right panel 20 are wrapped around the right edge rod 68 of the top panel 14 in the second direction 72 (i.e., inward). The lower end portions 32 of the vertical rods 12 of the right panel 20 are wrapped around the right edge rod 44 of the bottom panel 16 in the first direction 70 (i.e., outward). The assembled front view of the enclosure 10 is shown in FIG. 3.

Figure 5A:
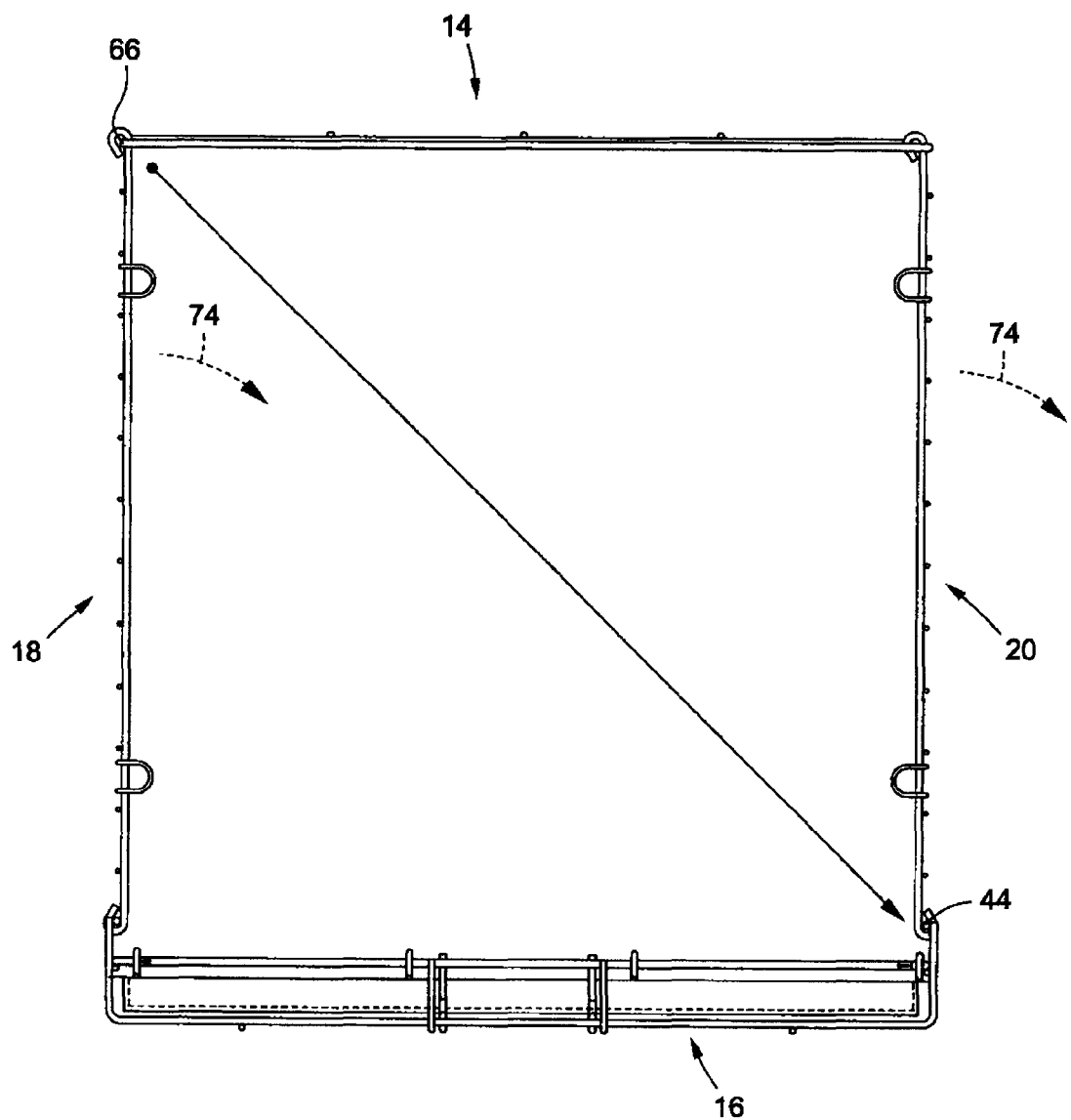
FIG. 5A is a front view of the enclosure shown in FIG. 4B.
Figure 5C:
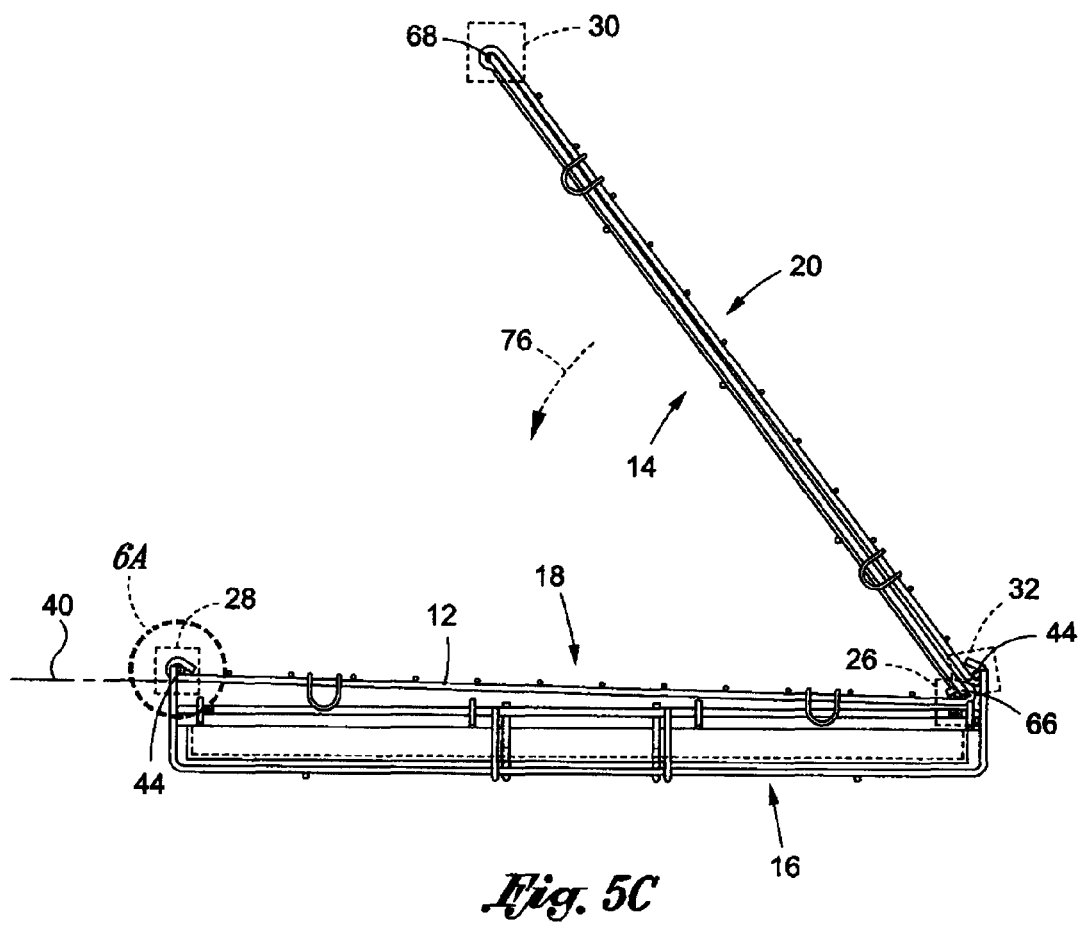
FIG. 5C is a front view of the enclosure shown in FIG. 5B wherein top and right panels are being stacked onto the left and bottom panels.
Figure 5D:
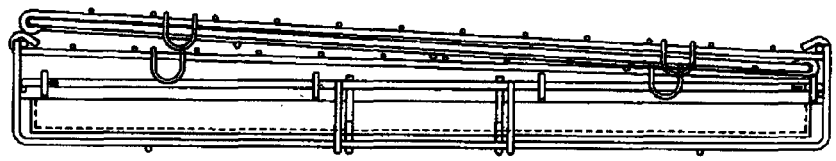
FIG. 5D is a front view of the enclosure shown in FIG. 5C wherein the enclosure is in the collapsed position.

With the front and rear panels 22, 24 folded downward as shown in FIG. 5A, the left panel 18, the right panel 20 and the top panel 14 are shifted to the right as shown by directional arrow 74. In doing this, the left edge rod 66 of the top panel 14 is traversed toward the right edge rod 44 of the bottom panel 16, as shown in FIGS. 5B-5C. Referring now to FIG. 5C, since the lower end portion 28 of the rods 12 of the left panel 18 is wrapped around the left edge rod 44 of the bottom panel 16 in the first direction 70 (i.e., outward direction), the plane 40 within which the left panel 18 resides is disposed below the left edge rod 44. This provides additional space for the stacking of the left panel 18, top panel 14 and the right panel 20 upon each other, as shown in FIG. 5D. The end portions 26-32 are formed in a hook configuration defining the pivot axis 36. The pivot axis is offset from the plane 40 within which the panel resides 18, 14, 20. This is more clearly shown in FIGS. 6A and 6B. The upper end portions 26 of the rods of the left panel 18 are also wrapped around the left edge rod 66 of the top panel 14 in the first direction 70. Accordingly, the pivot axis 36 about which the top panel 14 pivots about the left panel 18 is offset from the plane 40 within which the left panel 18 resides. This allows the top panel 14 to pivot and be folded upon or stacked up on the left panel 18 as shown by directional arrow 76. The upper end portions 30 of the rods 12 of the right panel 20 are wrapped around the edge rod 68 of the top panel 14. This allows the top panel 14 to be folded under the right panel 20.

The lower end portions 32 of the rods 12 of the right panel 20 are shown as being wrapped around the edge rod 44 of the bottom panel 16 in the first direction 70. However, it is also contemplated that the lower end portions 32 of the rods 12 of the right panel 20 may also be wrapped around the edge rod 44 of the bottom panel 16 in the second direction 72.

Once the left edge rod 66 of the top panel 14 is disposed adjacent to the right edge rod 44 of the bottom panel 16, as shown in FIG. 5C, the top panel 14 and the right panel 20 are traversed in the direction of arrow 76 until the top and right panels 14, 20 are stacked upon the left panel 18, as shown in FIG. 5D.

The hook configuration of the upper and lower end portions 26-32 provide for snag free rotation of the left and right panel 18, 20 in relation to the top and bottom panels 14, 16. Only one edge rod 42, 44 is disposed within each of the upper and lower end portions 26-32 formed into the hook configuration.

Figure 7:
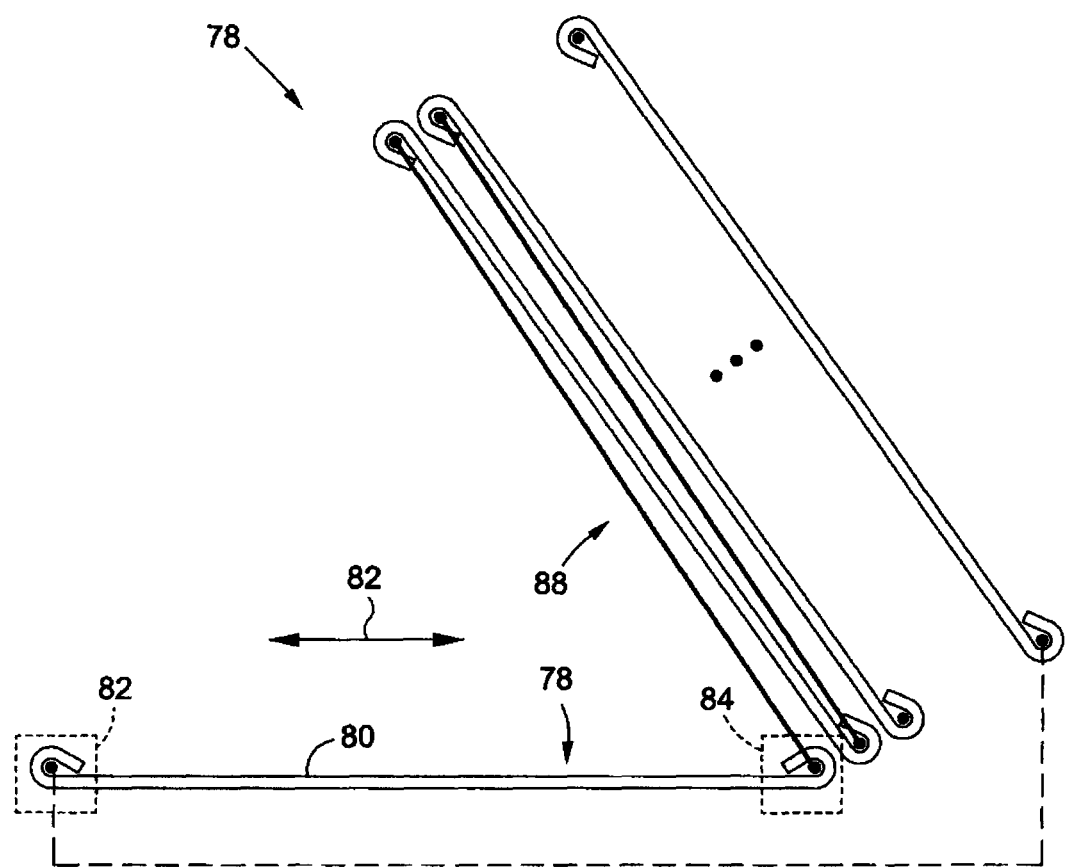
FIG. 7 is an alternative embodiment of various aspects of the enclosure.

The enclosure 10 is shown and described as having a box configuration. However, other configurations are also contemplated. By way of example and not limitation, the front and back panels 22, 24 may protrude out to form a polygonal enclosure. Also, additional panels may be added to the left, top and right panels 18, 14, 20 as shown in FIG. 7. These additional panels in addition to the left, top and right panels 18, 14, 28 may be stacked upon each other in a zigzag pattern.

By way of example and not limitation, referring to FIG. 6, a plurality of panels 78 may be connected edge to edge. The panel 78 may have a plurality of rods 80 formed in a grid pattern. The rods 80 that extend along the direction of arrow 82 define opposed end portions 84, 86 that are wrapped around edge rods 80 of an adjacent panel 88. The panels 78 are similar to the left and right panels 18, 20 shown in relation to FIGS. 1-5D in that the panels 78 have rods 80 with end portions that are wrapped around the edge rods 80 of the adjacent panels 88. The panels 88 are similar to the top panel 14 shown in relation to FIGS. 1-5D in that the panels 88 do not have end portions 84, 86 that are wrapped around the edge rods 90 of any adjacent panels 88. Instead, the panels 88 have edge rods 90 that form the periphery of the panel 88 and which are linked to the hook configured end portions 84, 86 of the panels 78.

Figure 8:
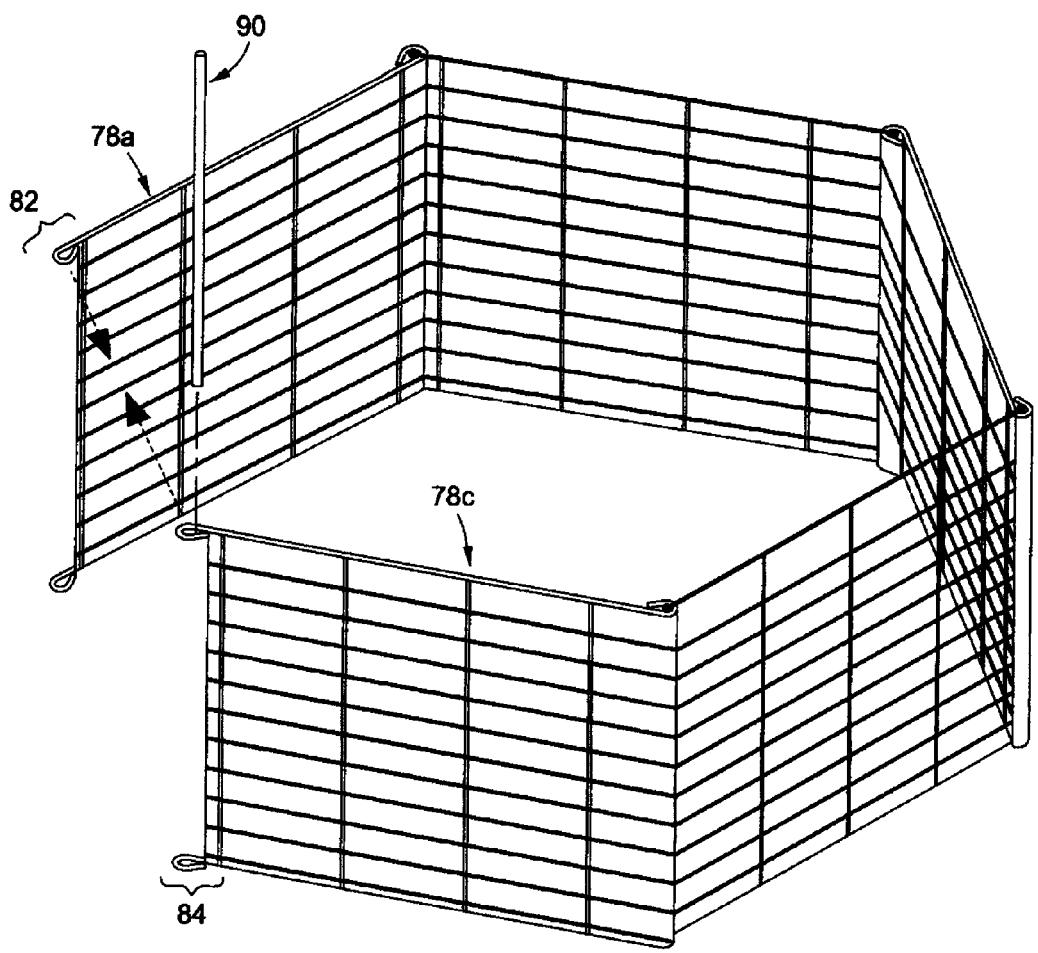
FIG. 8 is a further alternative embodiment of the various aspects of the enclosure.
Figure 9:
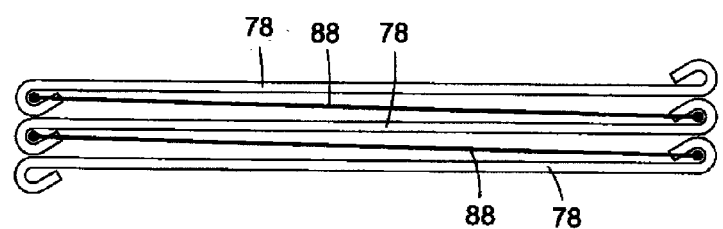
FIG. 9 illustrates the embodiment shown in FIG. 8 in a collapsed position.

Referring now to FIG. 8, the plurality of panels 78, 88 may be used to fence off an area. The end panels 78a, c may be joined to each other with a rod 90 that is inserted in the hook configured end portions 82, 84. The panels 78, 88 may also be collapsed as shown in FIG. 9.

The above description is given by way of example, and not limitation. Given the above disclosure, one skilled in the art could devise variations that are within the scope and spirit of the invention disclosed herein, including various ways arranging the panels together. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A collapsible enclosure for containing an animal, the enclosure comprising:

a top panel having front, rear, left and right rods;

a bottom panel disposed below the top panel when the collapsible enclosure is, in an erected position, the bottom panel having front, rear, left and right rods;

a front panel pivotally attached to the front rod of the bottom panel and removably attachable to the front rod of the top panel;

a rear panel pivotally attached to the rear rod of the bottom panel and removably attachable to the rear rod of the top panel;

a left panel pivotally attached to the left rods of the top and bottom panels, the left panel having a plurality of vertical rods, each of the vertical rods of the left panel defining opposed end portions that are wrapped around the left rods of the top and bottom panels in a hook configuration for pivotally attaching the left panel to the left rods of the top and bottom panels, the opposed end portions of the vertical rods of the left panel are wrapped in a common direction to the left rods of the top and bottom panels;

a right panel pivotally attached to the right rods of the top and bottom panels, the right panel having a plurality of vertical rods, each of the vertical rods of the right panel defining opposed end portions that are wrapped around the right rods of the top and bottom panels in the hook configuration for pivotally attaching the right panel to the right rods of the top and bottom panel, the upper end portions of the vertical rods of the right panel are wrapped in different directions to the left rods of the top and bottom panels;

wherein hook configuration of the opposed end portions of the vertical rods of the left and right panels place the left and right panels in a plane offset from pivot axes defined by the hook configured opposed end portions of the vertical rods of the left and right panels, and the left and right panels and the top panel are pivotably stacked and placed in a parallel configuration on top of the bottom panel for collapsing the enclosure.

2. The enclosure of claim 1 wherein the common direction is outward so that the hook configured opposed end portions of the vertical rods of the left panel are directed outward, and the left panel is in a plane offset inward from the pivot axes of the hook configured opposed end portions of the vertical rods of the left panel.

3. The enclosure of claim 1 wherein the different directions are outward and inward, the hook configured upper end portions of the vertical rods of the right panel are directed inward, the hook configured lower end portions of the vertical rods of the right panel are directed outward.

4. The enclosure of claim 1 wherein the right rod of the bottom panel is vertically offset from a plane of the bottom panel an equal distance compared to the left rod of the bottom panel.

5. The enclosure of claim 1 wherein the hook configured lower end portions of the vertical rods of the right panel are directed outward.

6. The enclosure of claim 1 wherein each of the panels is fabricated from a plurality of rods perpendicular to each other.

7. The enclosure of claim 1 wherein a single left rod of the top panel is enclosed within the hook configured upper end portions of the left panel, and a single right rod of the top panel is enclosed within the hook configured upper end portions of the right panel.

* * * * *